Aug. 28, 1951     H. E. SCOTT     2,565,633
ILLUMINATED FISHING ROD HANDLE
Filed Sept. 27, 1946
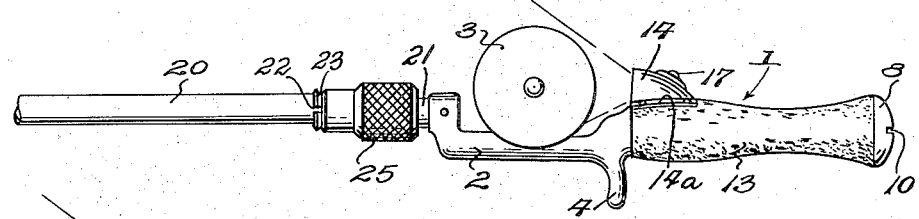
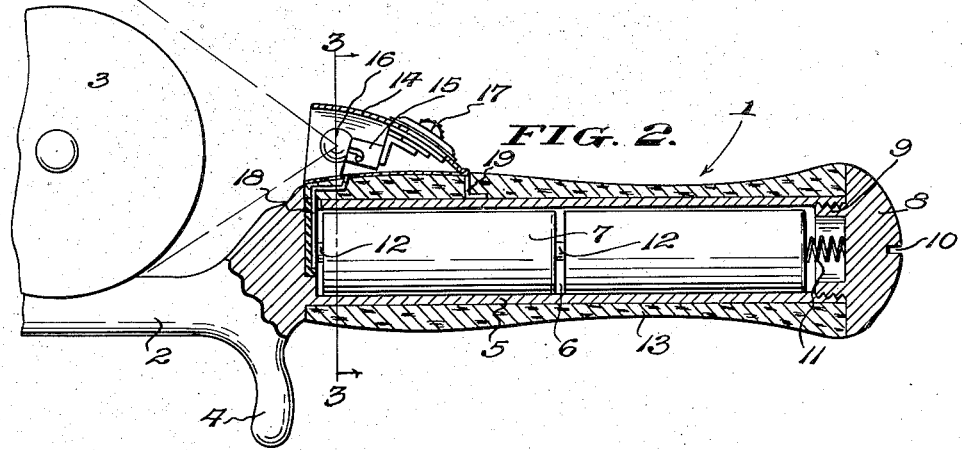
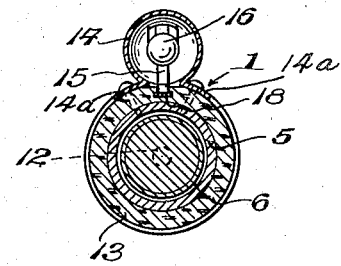
Inventor
Harry Elwood Scott
By W. S. McDowell
Attorney

Patented Aug. 28, 1951

2,565,633

UNITED STATES PATENT OFFICE 2,565,633

ILLUMINATED FISHING ROD HANDLE

Harry Elwood Scott, Columbus, Ohio

Application September 27, 1946, Serial No. 699,947

1 Claim. (Cl. 43—23)

This invention relates to fishing rods and, more particularly, to the handle construction of such rods, it being an object of the invention to provide a fishing rod having a handle embodying improved means for illuminating the line reel mounted on the handle, whereby to afford convenience and certainty when the rod is used for fishing at night or under other conditions of relative darkness.

It is another object of the invention to provide a fishing rod wherein the reel-carrying handle thereof is formed with a longitudinally disposed axial chamber for the reception of one or more flash light dry battery cells, and wherein the latter are employed, under the control of an exteriorly accessible manually operated switch, to energize an incandescent lamp bulb, mounted in a reflector on the outside of the handle, to direct and concentrate the light of the bulb on the reel structure of the handle.

For a further understanding of additional objects and advantages of the invention, reference is to be had to the following description and accompanying drawings, wherein:

Fig. 1 is a side elevational view of an illuminated fishing rod handle formed in accordance with the present invention;

Fig. 2 is an enlarged partial vertical sectional view taken through the handle;

Fig. 3 is a transverse vertical sectional view taken on the plane indicated by the line 3—3 of Fig. 2.

Referring more particularly to the drawings, the numeral 1 designates my improved fishing rod handle in its entirety. The handle comprises a metallic frame member 2, on which is rotatably mounted a conventional line reel 3, the frame member being formed with a depending finger-engaging projection 4. At its rear end, the frame member is formed with a longitudinally extending barrel 5, the latter providing an axial chamber 6 which is closed at its forward end and which is adapted to receive a plurality of dry battery flash light cells 7 of standard manufacture in such a manner as to ground the same. The rear end of the chamber is closed by means of a removable cap 8, the latter being formed with a forwardly extending socketed boss 9, which is externally threaded for reception in the internally threaded end of the barrel 5. Exteriorly, the cap is formed with a notch 10, shaped to receive the end of a screw driver, coin or the like, so that facility may be had in screwing and unscrewing a cap into and from its operative position in the rear end of the barrel. The socketed portion of the boss 9 carries a coil spring 11, which engages the cells 7 to force the same toward the forward closed end of the chamber 6, thereby maintaining the contact terminals 12 of the cells in circuit-completing engagement.

Surrounding the barrel 5 is a tubular handle grip 13 of cork or other similar material capable of enabling the handle to be gripped by the used of the rod in a non-slipping manner and providing insulation against heat.

Mounted on the top and forward portion of the grip 13 is an arcuate lamp reflector 14 which, at its forward end, resembles the major portion of a circle having lower outwardly turned legs 14a secured to the grip 13, and which tapers downwardly at its upper surface from its forward to its rearward end to close the reflector. On the top of the reflector housing, there is positioned a thumb-actuated sliding switch 17 in contact with said barrel and bulb by means of which the electrical circuit to the bulb may be conveniently controlled. In this connection, the terminal of the forward battery cell engages a contact strip 18 which extends downwardly from the lamp mounting 15 between the legs 14a of the reflector, and which is insulated from the walls of the barred 5. A second contact strip 19 leads from the switch 17 and is grounded on the barrel 5.

It will be noted that the open end of the reflector 14 faces toward the reel structure, so that when the bulb 16 is energized, the light emanating therefrom will be directed fully upon the reel to secure adequate illumination of the latter. The handle 1 is detachably connected with the forwardly extending rod sections 20, so that the latter may be detached from the handle, and also the reel structure, permitting the handle to be employed in the capacity of a flash light when needed. Any suitable means may be provided for detachably connecting the forward end of the handle 1 with the rod sections 20. In this instance, the forward end of the frame member 2 carries a forwardly projecting and longitudinally disposed sleeve 21, which is provided with a plurality of radially disposed and longitudinally extending slots 22 which provide between them resilient rod-gripping fingers 23. The fingers 23 are exteriorly threaded for the reception of internal threads provided on a clamping collar 25. To remove the rod sections, the collar 25 is rotated so that it moves rearwardly on the sleeve 21 to permit the fingers 23 to expand relative to one another and thereby free the rod sections 20. Other equivalent fastening means may be used for detachably uniting the rod section with the handle.

It will thus be apparent that the present invention provides an illuminated handle structure for fishing rods through the use of which night fishing is made entirely feasible and convenient to carry out. The apparatus is essentially simple in its construction and design, and possesses the reliability in convenience and control of an ordinary flash light. Not only does the construction provide for convenience in fishing, but also it may be used as a general source of illumination when a fisherman is required to walk through dark places or when engaged in various operations incidental to fishing.

It will be understood that the illuminating means forming the present invention may be applied to either casting or fly-rods, as desired.

I claim:

A handle for fishing rods comprising: a body formed with a longitudinally extending metal barrel; the latter being closed at one end and open at its other; a dry battery cell positioned in said barrel in such manner as to be grounded thereby; a removable cap normally closing the open end of said barrel; spring means interposed between said cap and the battery cell to advance the latter forwardly of the open end of the barrel toward the closed end thereof; a reflector housing positioned on the forward outer portion of said body and having a cross-sectional shape at its forward end which resembles the major portion of a circle terminating in lower outwardly directed legs which are rigidly secured to said body, said reflector housing having an upper surface which is curved downwardly from its forward to its rear end to close the latter; an incandescent lamp bulb positioned in said reflector housing; conductor means at the closed end of said barrel extending downwardly between said legs to contact one terminal of said cell for conducting current from the latter to the lamp bulb; and a manually operated switch mounted on the upper surface of said reflector casing and having stationary parts in contact with said barrel and bulb for controlling current flow from said cell through said conductor means to said lamp bulb.

HARRY ELWOOD SCOTT.

REFERENCES CITED

The following references are of record in the file of this patent:

UNITED STATES PATENTS

| Number | Name | Date |
| --- | --- | --- |
| 108,679 | Boyden | Oct. 25, 1870 |
| 1,820,960 | Champagne et al. | Sept. 1, 1931 |
| 2,000,263 | Teetor | May 7, 1935 |
| 2,006,251 | Rollins | June 25, 1935 |
| 2,152,385 | Mayer et al. | Mar. 28, 1939 |
| 2,409,988 | Schwebs | Oct. 22, 1946 |